United States Patent
Liu et al.

(10) Patent No.: US 11,952,298 B2
(45) Date of Patent: Apr. 9, 2024

(54) METHOD FOR DEODORIZING SLUDGE WITH METAL SALT AND TANNIN EXTRACT TOGETHER, DEODORIZED SLUDGE, AND USE THEREOF

(71) Applicant: FUZHOU UNIVERSITY, Fuzhou (CN)

(72) Inventors: Minghua Liu, Fuzhou (CN); Jiantao Lin, Fuzhou (CN); Shuyu Jiang, Fuzhou (CN); Yuchuan Yang, Fuzhou (CN); Yuxin Zhou, Fuzhou (CN); Yifan Liu, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 0 days.

(21) Appl. No.: 18/287,034

(22) PCT Filed: Oct. 15, 2021

(86) PCT No.: PCT/CN2021/123978
§ 371 (c)(1),
(2) Date: Oct. 16, 2023

(87) PCT Pub. No.: WO2022/227418
PCT Pub. Date: Nov. 3, 2022

(65) Prior Publication Data
US 2024/0083798 A1 Mar. 14, 2024

(30) Foreign Application Priority Data
Apr. 26, 2021 (CN) .......................... 202110454842.4

(51) Int. Cl.
C02F 11/00 (2006.01)
(52) U.S. Cl.
CPC .......... C02F 11/00 (2013.01); C02F 2303/02 (2013.01)
(58) Field of Classification Search
CPC .................................................... C02F 11/00
See application file for complete search history.

(56) References Cited

U.S. PATENT DOCUMENTS

| 2013/0192322 A1* | 8/2013 | Miller ..................... C05C 11/00 |
| | | 71/23 |
| 2014/0116949 A1 | 5/2014 | P et al. |
| 2015/0197439 A1* | 7/2015 | Zou ........................ D21H 17/01 |
| | | 210/730 |
| 2016/0347631 A1 | 12/2016 | Dong et al. |
| 2022/0295797 A1* | 9/2022 | Karring ................... C11D 3/32 |
| 2022/0315502 A1* | 10/2022 | Lee ........................... C05G 5/20 |

FOREIGN PATENT DOCUMENTS

| CN | 1515321 A | 7/2004 |
| CN | 102500599 A | 6/2012 |
| CN | 105858841 A | 8/2016 |
| CN | 108816019 A | 11/2018 |
| CN | 111807674 A | 10/2020 |
| CN | 112047611 A | 12/2020 |
| CN | 112441655 A | 3/2021 |
| CN | 113387523 A | 9/2021 |
| JP | H11128662 A | 5/1999 |
| WO | 2018110148 A1 | 6/2018 |

* cited by examiner

*Primary Examiner* — Chester T Barry
(74) *Attorney, Agent, or Firm* — Bayramoglu Law Offices LLC

(57) ABSTRACT

A method for deodorizing sludge with a metal salt and a tannin extract together, deodorized sludge, and use thereof are provided. The present invention provides a sludge deodorization technology that has high treatment efficiency, environmental friendliness, and low investment costs, and satisfies harmless requirements of subsequent resource utilization such as incineration, pyrolysis, or carbonization. Characterized by containing abundant phenolic hydroxyl groups, the tannin extract is used as a multidentate ligand to undergo a complexation reaction with metal ions, which reduces bioavailability of proteins and other macromolecules, and effectively inhibits production of low-volatile sulfides, thereby significantly deodorizing the sludge during standing and combustion. The whole deodorization process of the present invention is simple and feasible, is flexible in operation, requires no complex and harsh reaction conditions or expensive equipment, has low operating costs, and can be used as a supporting pretreatment technology for resource utilization of sludge.

13 Claims, No Drawings

METHOD FOR DEODORIZING SLUDGE WITH METAL SALT AND TANNIN EXTRACT TOGETHER, DEODORIZED SLUDGE, AND USE THEREOF

CROSS REFERENCE TO THE RELATED APPLICATIONS

This application is the national phase entry of International Application No. PCT/CN2021/123978, filed on Oct. 15, 2021, which is based upon and claims priority to Chinese Patent Application No. 202110454842.4, filed on Apr. 26, 2021, the entire contents of which are incorporated herein by reference.

TECHNICAL FIELD

The present invention relates to the field of sludge treatment technologies, and more specifically, to a method for deodorizing sludge with a metal salt and a tannin extract together, deodorized sludge, and use thereof.

BACKGROUND

Sludge is an inevitable product of treatment of domestic and industrial wastewater by sewage treatment plants, which is characterized by large production and complex composition, and containing a large number of pathogenic microorganisms, heavy metals, and organic matter, and is prone to decay and emits an odor. Sludge without being properly and safely treated is likely to cause harm to soil, water sources, and even human body through a food chain after the sludge enters the environment again. In addition, proper treatment and utilization of sludge can implement "reuse of waste", producing huge ecological, economic, and social benefits. At present, by using concentration, digestion, dehydration, drying, and other treatment methods, water in sludge can be reduced, significantly reducing a volume of the sludge, which facilitates storage and transportation, and therefore facilitates further resource utilization processes such as incineration, composting, preparation of building materials, and oil production by pyrolysis. However, during the foregoing treatment and disposal, the sludge releases various toxic and harmful gases (such as an ammonia gas, hydrogen sulfide, methyl mercaptan, methyl sulfide, carbon disulfide, and dioxins), and heavily emits irritating and unpleasant odors, which seriously affect surrounding living environment and life health. Moreover, with the rapid development of urbanization, people's public environmental awareness is increasingly enhanced, and sludge odors have attracted more and more attention. Therefore, effective control of sludge odors has become a major practical problem in resource utilization of sludge.

Existing sludge deodorization methods include a physical method, a biological method, and a chemical method. (1) The physical method is to mask, transfer, or dilute an odor in sludge by physical means without changing the nature of the sludge. Common physical deodorization methods include activated carbon adsorption, liquid adsorption, and the like. Activated carbon has a well-developed pore structure, a high specific surface area, and abundant surface-active groups, which can implement specific adsorption of odorous substances. This method can provide high deodorization efficiency and simple maintenance. However, due to high costs, limited adsorption capacity, and inability to resolve the problem from the root, activated carbon materials are usually suitable for post-treatment of a deodorized gas. (2) The biological method is to capture, digest, and decompose odorous substances in sludge with specific microorganisms. The biological method is widely used. In addition to removing common $H_2S$ and $NH_3$, the biological method also has a good effect on thiols, sulfides, and other odors, without secondary pollution. However, operation and maintenance costs are high, and survival of microorganisms is susceptible to environmental influences. (3) The main principle of the chemical method is to make odorous substances in sludge react with some chemical substances to change chemical properties of odors, so as to implement deodorization. In current practical use, commonly used chemical deodorization methods mainly include chemical oxidation, chemical absorption, and combustion. A chemical deodorization process has high pertinence, and has a good deodorization effect on a high-concentration odor environment. However, removal of the odors from the sludge by using the chemical method also has certain limitations. For example, addition of a chlorine-containing oxidant during deodorization of sludge may increase the chlorine content in the sludge, which is likely to cause large production of highly toxic dioxins from the sludge in resource utilization processes such as incineration and building material firing. In addition, use of ozone as an oxidant can remove a hydrogen sulfide gas from sludge at a very high reaction rate. However, ozone is unstable, corrodes equipment and pipeline materials, and has high preparation costs, which consequently limits this technology to be widely used.

In recent years, natural polymer materials with wide sources, low costs, biodegradability, and no secondary pollution have been widely used. A tannin extract, also referred to as plant tannin, is a secondary metabolite with a polyphenol structure that widely exists in plants, mainly existing in skin, roots, leaves, and fruits of the plants. The tannin extract has very huge reserves in nature, and is the fourth largest forest by-product after cellulose, lignin, and hemicellulose. At present, there are studies that introduce the tannin extract into sludge treatment and disposal, and resource utilization. For example, the Chinese Patent Application No. CN202010775794.4 discloses a sludge dehydration conditioning method based on a protein denaturant. A protein denaturant with a tannin extract as a main component is added into to-be-conditioned sludge, prior to magnetic stirring, to fully carry out a protein denaturation reaction. During the reaction, surface hydrophilicity of extracellular proteins is reduced due to protein complexation and denaturation. Then, a protein emulsification coagulant is added and stirred quickly to further help promote coagulation and aggregation of water-holding extracellular proteins in the sludge, reduce dispersed water-holding capacity of the proteins, and then greatly reduce overall water-holding capacity of the sludge flocs, thereby improving dehydration performance of the sludge. The Chinese Patent Application No. CN202010529402.6 discloses a method for enhancing dehydration performance of activated sludge with cationic starch grafted condensed tannin. Cationic starch grafted condensed tannin is added into distilled water and gelatinized uniformly, to obtain a cationic starch grafted condensed tannin suspension. After cooling down to room temperature, the suspension is added into activated sludge and fully reacts in a stirrer, to obtain activated sludge with dehydration performance enhanced.

The foregoing patents only focus on the role of the tannin extract in improving dehydration performance of sludge, but do not find out that the tannin extract with a polyphenol hydroxyl structure can inhibit formation of odorous substances in the sludge, which has certain potential for sludge deodorization. In addition, the sludge obtained through treatment by using the technical methods of the foregoing patents still produces odors such as an ammonia gas, hydrogen sulfide, methyl mercaptan, methyl sulfide, and carbon disulfide and toxic and harmful substances such as dioxins in a subsequent resource utilization process, for example, incineration, pyrolysis, or carbonization, which needs to be properly resolved.

In conclusion, it is of great significance to develop a sludge deodorization technology that has high treatment efficiency, environmental friendliness, and low investment costs, and satisfies harmless requirements of subsequent resource utilization such as incineration, pyrolysis, or carbonization.

SUMMARY

In view of the foregoing technical problems in the background, it is necessary to provide a method for deodorizing sludge with a metal salt and a tannin extract together. The method needs to satisfy requirements of subsequent resource utilization such as incineration, pyrolysis, or carbonization of the sludge, and is suitable for sludge of various sources and types. By using the method, the sludge can be modified based on a synergistic effect and complexation of the metal salt and the tannin extract, so that production and emission of odorous substances can be inhibited from the source. In addition, the modified sludge can further implement harmlessness and resource utilization of disposal methods such as incineration, pyrolysis, or carbonization.

To achieve the foregoing objective, according to a first aspect of the present invention, a method for deodorizing sludge with a metal salt and a tannin extract together is provided, including the following steps:

in parts by weight, uniformly mixing 9320-9910 parts of to-be-deodorized sludge and 20-100 parts of metal salt treatment solution, and adding a mixture of 50-500 parts of tannin extract treatment solution and 20-80 parts of pH adjuster, to obtain a sludge deodorization reaction system; and controlling a pH value of the sludge deodorization reaction system to be 6.2-7.5, and stirring the sludge deodorization reaction system at a speed of 15-120 r/min for 1-3 h, prior to standing for 12-48 h.

According to a second aspect of the present invention, deodorized sludge is provided. The deodorized sludge is obtained through treatment by using the method according to the first aspect of the present invention.

According to a third aspect of the present invention, use of deodorized sludge is provided. The deodorized sludge is the deodorized sludge according to the second aspect of the present invention.

Different from the related art, the foregoing technical solutions have at least the following beneficial effects:

1. In the method for deodorizing sludge with a metal salt and a tannin extract together provided by the present invention, by innovatively using the characteristic of the tannin extract containing abundant phenolic hydroxyl groups, the tannin extract is used as a multidentate ligand to undergo a complexation reaction with metal ions, to form a stable five-membered ring chelate. Moreover, the tannin extract also undergoes complexation with extracellular polymers (mainly composed of proteins and polysaccharides) of the sludge, to form crosslinks between protein peptide chains with hydrophobic bonds and hydrogen bonds, which reduces bioavailability of proteins and other macromolecules, and effectively inhibits production of low-volatile sulfides with low olfactory thresholds, such as hydrogen sulfide, methyl mercaptan, methyl sulfide, carbon disulfide, and dimethyl disulfide, thereby significantly deodorizing the sludge during standing and combustion, and satisfying the principle of harmlessness of the sludge.

2. The method for deodorizing sludge with a metal salt and a tannin extract together provided by the present invention satisfies the principle of reduction of the sludge. Extracellular polymers of the sludge are ubiquitous in and on the sludge flocs, and are an important factor that affects filtration and dehydration performance of the sludge. The tannin extract can easily complex with the extracellular polymers to reduce surface hydrophilicity of protein molecules, so that the sludge flocs become loose, and bound water of the sludge is released, thereby improving dehydration and drying performance of the sludge.

3. The method for deodorizing sludge with a metal salt and a tannin extract together provided by the present invention satisfies the principle of recycling of the sludge. As a natural plant extract, the tannin extract used in the present invention has many advantages such as wide sources, low costs, and green and environmental protection. Deodorization of the sludge with the tannin extract can avoid secondary pollution, which is safe and reliable, and also provides a new technical path for resource utilization of the tannin extract. In addition, the whole process of deodorizing the sludge of the present invention is simple and feasible, is flexible in operation, requires no complex and harsh reaction conditions or expensive equipment, and has low operating costs. Moreover, the obtained deodorized sludge may be used in a supporting pretreatment technology for resource utilization including but not limited to incineration, pyrolysis, or carbonization.

DETAILED DESCRIPTION OF THE EMBODIMENTS

The following describes in detail the method for deodorizing sludge with a metal salt and a tannin extract together according to the first aspect, the deodorized sludge according to the second aspect, and the use of deodorized sludge according to the third aspect of the present invention.

First, the method for deodorizing sludge with a metal salt and a tannin extract together according to the first aspect of the present invention is described.

According to the first aspect of the present invention, a method for deodorizing sludge with a metal salt and a tannin extract together is provided, including the following steps:

in parts by weight, uniformly mixing 9320-9910 parts of to-be-deodorized sludge and 20-100 parts of metal salt treatment solution, and adding a mixture of 50-500 parts of tannin extract treatment solution and 20-80 parts of pH adjuster, to obtain a sludge deodorization reaction system; and controlling a pH value of the sludge deodorization reaction system to be 6.2-7.5, and stirring the sludge deodorization reaction system at a speed of 15-120 r/min for 1-3 h, prior to standing for 12-48 h.

The tannin extract in the present invention is a natural plant extract that is environmentally friendly, and has wide sources and low costs. In the present invention, by innovatively using the characteristic of containing abundant phenolic hydroxyl groups, the tannin extract can be used as a multidentate ligand to undergo a complexation reaction with metal ions, to form a stable five-membered ring chelate. Moreover, the tannin extract also undergoes complexation with extracellular polymers (mainly composed of proteins and polysaccharides) of the sludge, to form crosslinks between protein peptide chains with hydrophobic bonds and hydrogen bonds, which reduces bioavailability of proteins and other macromolecules in the sludge, and effectively inhibits production of low-volatile sulfides with low olfactory thresholds, such as hydrogen sulfide, methyl mercaptan, methyl sulfide, carbon disulfide, and dimethyl disulfide, thereby significantly deodorizing the sludge during standing and combustion.

According to a preferred embodiment of the present invention, in percentage by mass, the metal salt treatment solution is an aqueous solution containing 0.5%-2.5% of one or more of ferrous sulfate, ferric sulfate, aluminum sulfate, ferric nitrate, and ferrous ammonium sulfate. In the present invention, plant tannin contained in the tannin extract reacts with ferrous ions to form ferrous tannate or a ferric tannate complex. Ferrous tannate is unstable and easily oxidized in the air to form a ferric tannate complex that is blue-black. Therefore, the metal salt treatment solution of the present invention is a sulfate or nitrate solution of ferrous ions, aluminum ions, or ferric ions, preferably, a sulfate or nitrate solution of ferrous ions or ferric ions.

According to a preferred embodiment of the present invention, in percentage by mass, the tannin extract treatment solution is an aqueous solution containing 5%-50% of one or more of a Myrica rubra tannin extract, a larch tannin extract, a valonea tannin extract, a quebracho tannin extract, and a wattle tannin extract. The Myrica rubra tannin extract, the larch tannin extract, the valonea tannin extract, the quebracho tannin extract, and the wattle tannin extract are all products obtained through extraction of raw plant materials containing tannin in a high content, such as bark, wood, and shells, prior to concentration, which are brownish yellow to tan and divided into powders and blocks.

According to a preferred embodiment of the present invention, in percentage by mass, the pH adjuster is an aqueous solution containing 2%-8% of one or more of acetic acid, sulfamic acid, sulfuric acid, formic acid, and oxalic acid.

According to a preferred embodiment of the present invention, a reaction temperature for the sludge deodorization reaction system is controlled to be 25° C.-80° C. Increase of the temperature helps dispersion and penetration of tannin in the tannin extract, and also promotes binding of the tannin and the extracellular polymers of the sludge. However, when the temperature is excessively high, oxidation of tannin accelerates, and proteins in the sludge are easily denatured and lose bioactivity. Therefore, in the present invention, the reaction temperature for the sludge deodorization reaction system is controlled to be 25° C.-80° C.

According to a preferred embodiment of the present invention, the 9320-9910 parts of to-be-deodorized sludge and the 20-100 parts of metal salt treatment solution are uniformly mixed by stirring at a speed of 15-120 r/min for 1-3 h.

According to a preferred embodiment of the present invention, the to-be-deodorized sludge includes domestic sewage sludge, industrial wastewater sludge, drain-pipe sludge, and/or water-sediment sludge.

According to a preferred embodiment of the present invention, the to-be-deodorized sludge includes one or more of untreated primarily precipitated sludge, secondarily precipitated residual sludge, raw sludge obtained by mixing the untreated primarily precipitated sludge and the secondarily precipitated residual sludge, aerobically or anaerobically digested sludge, and dehydrated and dried sludge.

Then, the deodorized sludge according to the second aspect of the present invention is described.

Provided is deodorized sludge. The deodorized sludge is obtained through treatment by using the method according to the first aspect of the present invention.

The deodorized sludge obtained through treatment by using the method according to the first aspect of the present invention produces greatly reduced contents of low-volatile sulfides with low olfactory thresholds, such as hydrogen sulfide, methyl mercaptan, methyl sulfide, carbon disulfide, and dimethyl disulfide. As bound water of the sludge is released, dehydration and drying performance of the deodorized sludge is improved.

Finally, the use of deodorized sludge according to the third aspect of the present invention is described.

Provided is use of deodorized sludge. The deodorized sludge is the deodorized sludge according to the second aspect of the present invention.

The deodorized sludge according to the second aspect of the present invention also contains a large amount of organic matter. After being fully deodorized by using the method according to the first aspect of the present invention, the deodorized sludge may be used in resource utilization including but not limited to incineration, pyrolysis, or carbonization.

To describe in detail the technical content, structural characteristics, and achieved objectives and effects of the technical solutions, the following is described in detail with specific examples. It should be understood that these examples are intended only to illustrate this application but are not intended to limit the scope of this application.

Example 1

This example provides a method for deodorizing sludge with a metal salt and a tannin extract together, including the following specific steps:

First, 9320 parts of to-be-deodorized sludge from domestic sewage were put in a stirring machine at a reaction temperature controlled to be 25° C. Next, 100 parts of metal salt treatment solution were added. A stirrer was turned on to carry out stirring at 120 r/min for 1 h for mixing uniformly. Then, 500 parts of tannin extract treatment solution and 80 parts of pH adjuster were mixed and added into the stirring machine at a pH value controlled to be 6.2, then stirred at 120 r/min for 3 h, and left to stand for 12 h, to effectively deodorize the sludge. In this example, the metal salt treatment solution is an aqueous solution containing 2.5% of ferrous sulfate in percentage by mass, the tannin extract treatment solution is an aqueous solution containing 50% of a Myrica rubra tannin extract in percentage by mass, and the pH adjuster is an aqueous solution containing 8% of acetic acid in percentage by mass.

Example 2

This example provides a method for deodorizing sludge with a metal salt and a tannin extract together, including the following specific steps:

First, 9910 parts of to-be-deodorized sludge from industrial wastewater were put in a stirring machine at a reaction temperature controlled to be 60° C. Next, 20 parts of metal salt treatment solution were added. A stirrer was turned on to carry out stirring at 15 r/min for 1 h for mixing uniformly. Then, 50 parts of tannin extract treatment solution and 20 parts of pH adjuster were mixed and added into the stirring machine at a pH value controlled to be 7.5, then stirred at 15 r/min for 2 h, and left to stand for 12 h, to effectively deodorize the sludge. In this example, the metal salt treatment solution is an aqueous solution containing 0.5% of aluminum sulfate in percentage by mass, the tannin extract treatment solution is an aqueous solution containing 5% of a Myrica rubra tannin extract in percentage by mass, and the pH adjuster is an aqueous solution containing 2% of oxalic acid in percentage by mass.

Example 3

This example provides a method for deodorizing sludge with a metal salt and a tannin extract together, including the following specific steps:

First, 9780 parts of to-be-deodorized sludge from municipal sewage treatment plants were put in a stirring machine at a reaction temperature controlled to be 40° C. Next, 100 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 12 h, to effectively deodorize the sludge. In this example, the metal salt treatment solution is an aqueous solution containing 2.5% of ferrous sulfate in percentage by mass, the tannin extract treatment solution is an aqueous solution containing 10% of a Myrica rubra tannin extract in percentage by mass, and the pH adjuster is an aqueous solution containing 2% of sulfamic acid in percentage by mass.

Example 4

This example provides a method for deodorizing sludge with a metal salt and a tannin extract together, including the following specific steps:

First, 9830 parts of to-be-deodorized sludge from domestic sewage were put in a stirring machine at a reaction temperature controlled to be 40° C. Next, 50 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 12 h, to effectively deodorize the sludge. In this example, the metal salt treatment solution is an aqueous solution containing 1.25% of ferrous sulfate in percentage by mass, the tannin extract treatment solution is an aqueous solution containing 10% of a Myrica rubra tannin extract in percentage by mass, and the pH adjuster is an aqueous solution containing 2% of sulfamic acid in percentage by mass.

Example 5

This example provides a method for deodorizing sludge with a metal salt and a tannin extract together, including the following specific steps:

First, 9830 parts of to-be-deodorized sludge from domestic sewage were put in a stirring machine at a reaction temperature controlled to be 40° C. Next, 50 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 18 h, to effectively deodorize the sludge. In this example, the metal salt treatment solution is an aqueous solution containing 2.5% of ferric nitrate in percentage by mass, the tannin extract treatment solution is an aqueous solution containing 10% of a Myrica rubra tannin extract in percentage by mass, and the pH adjuster is an aqueous solution containing 2% of sulfuric acid in percentage by mass.

Example 6

This example provides a method for deodorizing sludge with a metal salt and a tannin extract together, including the following specific steps:

First, 9830 parts of to-be-deodorized sludge from domestic sewage were put in a stirring machine at a reaction temperature controlled to be 40° C. Next, 50 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 18 h, to effectively deodorize the sludge. In this example, the metal salt treatment solution is an aqueous solution containing 1.25% of ferrous ammonium sulfate in percentage by mass, the tannin extract treatment solution is an aqueous solution containing 10% of a Myrica rubra tannin extract in percentage by mass, and the pH adjuster is an aqueous solution containing 2% of formic acid in percentage by mass.

Example 7

This example provides a method for deodorizing sludge with a metal salt and a tannin extract together, including the following specific steps:

First, 9830 parts of to-be-deodorized sludge from domestic sewage were put in a stirring machine at a reaction temperature controlled to be 40° C. Next, 50 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 12 h, to effectively deodorize the sludge. In this example, the metal salt treatment solution is an aqueous solution containing 1.25% of ferrous sulfate in percentage by mass, the tannin extract treatment solution is an aqueous solution containing 10% of a larch tannin extract in percentage by mass, and the pH adjuster is an aqueous solution containing 2% of sulfamic acid in percentage by mass.

Example 8

This example provides a method for deodorizing sludge with a metal salt and a tannin extract together, including the following specific steps:

First, 9810 parts of to-be-deodorized sludge from drain pipes were put in a stirring machine at a reaction temperature controlled to be 40° C. Next, 50 parts of metal salt treatment solution were added. A stirrer was turned on to carry out stirring at 90 r/min for 1 h for mixing uniformly. Then, 100 parts of tannin extract treatment solution and 40 parts of pH adjuster were mixed and added into the stirring machine at a pH value controlled to be 6.6, then stirred at 90 r/min for 2 h, and left to stand for 12 h, to effectively deodorize the sludge. In this example, the metal salt treatment solution is an aqueous solution containing 1.25% of ferric sulfate in percentage by mass, the tannin extract treatment solution is an aqueous solution containing 10% of a wattle tannin extract in percentage by mass, and the pH adjuster is an aqueous solution containing 4% of acetic acid in percentage by mass.

Example 9

This example provides a method for deodorizing sludge with a metal salt and a tannin extract together, including the following specific steps:

First, 9760 parts of to-be-deodorized sludge from water sediment were put in a stirring machine at a reaction temperature controlled to be 60° C. Next, 20 parts of metal salt treatment solution were added. A stirrer was turned on to carry out stirring at 60 r/min for 1 h for mixing uniformly. Then, 200 parts of tannin extract treatment solution and 20 parts of pH adjuster were mixed and added into the stirring machine at a pH value controlled to be 7.5, then stirred at 60 r/min for 2 h, and left to stand for 12 h, to effectively deodorize the sludge. In this example, the metal salt treatment solution is an aqueous solution containing 0.5% of ferrous sulfate in percentage by mass, the tannin extract treatment solution is an aqueous solution containing 20% of a quebracho tannin extract in percentage by mass, and the pH adjuster is an aqueous solution containing 2% of oxalic acid in percentage by mass.

Example 10

This example provides a method for deodorizing sludge with a metal salt and a tannin extract together, including the following specific steps:

First, 9830 parts of to-be-deodorized sludge from water sediment were put in a stirring machine at a reaction temperature controlled to be 80° C. Next, 50 parts of metal salt treatment solution were added. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, then stirred at 90 r/min for 2 h, and left to stand for 12 h, to effectively deodorize the sludge. In this example, the metal salt treatment solution is an aqueous solution containing 1.25% of ferrous sulfate in percentage by mass, the tannin extract treatment solution is an aqueous solution containing 10% of a larch tannin extract in percentage by mass, and the pH adjuster is an aqueous solution containing 2% of acetic acid in percentage by mass.

Comparative Example 1

First, 9930 parts of to-be-deodorized sludge from water sediment were put in a stirring machine at a reaction temperature controlled to be 40° C. Next, 50 parts of metal salt treatment solution were added. A stirrer was turned on to carry out stirring at 90 r/min for 1 h for mixing uniformly. 20 parts of pH adjuster were mixed and added into the stirring machine at a pH value controlled to be 7.5, and stirred at 90 r/min for 2 h. In this comparative example, the metal salt treatment solution is an aqueous solution containing 1.25% of ferrous sulfate in percentage by mass, and the pH adjuster is an aqueous solution containing 2% of acetic acid in percentage by mass.

Comparative Example 2

First, 9880 parts of to-be-deodorized sludge from water sediment were put in a stirring machine at a reaction temperature controlled to be 40° C. A stirrer was turned on to carry out stirring at 90 r/min for 1 h for mixing uniformly. Then, 100 parts of tannin extract treatment solution and 20 parts of pH adjuster were mixed and added into the stirring machine at a pH value controlled to be 7.5, and stirred at 90 r/min for 2 h. In this comparative example, the tannin extract treatment solution is an aqueous solution containing 10% of a larch tannin extract in percentage by mass, and the pH adjuster is an aqueous solution containing 2% of acetic acid in percentage by mass.

Process parameters involved in the methods for deodorizing sludge used in Example 1 to Example 10, and Comparative Example 1 and Comparative Example 2 are detailed in Table 1.

TABLE 1

| | Process parameters of Example 1 to Example 10 in the present invention | | | | | | | | | | |
|---|---|---|---|---|---|---|---|---|---|---|---|
| | To-be-deodorized sludge | | Metal salt treatment solution | | Tannin extract treatment solution | | PH adjuster | | Stirring of deodorization reaction system | | | PH value for deodorization reaction |
| Item | Type | Parts | Type | Parts | Type | Parts | Type | Parts | Speed (r/min) | Time (h) | Temperature (° C.) | / |
| Example 1 | Domestic sewage sludge | 9320 parts | Aqueous solution containing 2.5% of ferrous sulfate | 100 | Aqueous solution containing 50% of Myrica rubra tannin extract | 500 | Aqueous solution containing 8% of acetic acid | 80 | 120 | 3 | 25 | 6.2 |
| Example 2 | Industrial wastewater sludge | 9910 parts | Aqueous solution containing 0.5% of aluminum sulfate | 20 | Aqueous solution containing 5% of valonea tannin extract | 50 | Aqueous solution containing 2% of oxalic acid | 20 | 15 | 2 | 60 | 7.5 |

TABLE 1-continued

Process parameters of Example 1 to Example 10 in the present invention

| | To-be-deodorized sludge | | Metal salt treatment solution | | Tannin extract treatment solution | | PH adjuster | | Stirring of deodorization reaction system | | | PH value for deodorization reaction |
|---|---|---|---|---|---|---|---|---|---|---|---|---|
| Item | Type | Parts | Type | Parts | Type | Parts | Type | Parts | Speed (r/min) | Time (h) | Temperature (°C.) | / |
| Example 3 | Domestic sewage sludge | 9780 parts | Aqueous solution containing 2.5% of ferrous sulfate | 100 | Aqueous solution containing 10% of Myrica rubra tannin extract | 100 | Aqueous solution containing 2% of sulfamic acid | 20 | 90 | 2 | 40 | 7.5 |
| Example 4 | Domestic sewage sludge | 9830 parts | Aqueous solution containing 1.25% of ferrous sulfate | 50 | Aqueous solution containing 10% of Myrica rubra tannin extract | 100 | Aqueous solution containing 2% of sulfamic acid | 20 | 90 | 2 | 40 | 7.5 |
| Example 5 | Domestic sewage sludge | 9830 parts | Aqueous solution containing 1.25% of ferric nitrate | 50 | Aqueous solution containing 10% of Myrica rubra tannin extract | 100 | Aqueous solution containing 2% of sulfuric acid | 20 | 90 | 2 | 40 | 7.5 |
| Example 6 | Domestic sewage sludge | 9830 parts | Aqueous solution containing 1.25% of ferrous ammonium sulfate | 50 | Aqueous solution containing 10% of Myrica rubra tannin extract | 100 | Aqueous solution containing 2% of formic acid | 20 | 90 | 2 | 40 | 7.5 |
| Example 7 | Domestic sewage sludge | 9830 parts | Aqueous solution containing 1.25% of ferrous sulfate | 50 | Aqueous solution containing 10% of larch tannin extract | 100 | Aqueous solution containing 2% of sulfamic acid | 20 | 90 | 2 | 40 | 7.5 |
| Example 8 | Drain-pipe sludge | 9810 parts | Aqueous solution containing 1.25% of ferrous sulfate | 50 | Aqueous solution containing 10% of wattle tannin extract | 100 | Aqueous solution containing 4% of acetic acid | 40 | 90 | 2 | 40 | 6.6 |
| Example 9 | Water-sediment sludge | 9760 parts | Aqueous solution containing 0.5% of ferrous sulfate | 20 | Aqueous solution containing 20% of quebracho tannin extract | 200 | Aqueous solution containing 2% of oxalic acid | 20 | 60 | 1 | 60 | 7.5 |
| Example 10 | Domestic sewage sludge | 9830 parts | Aqueous solution containing 1.25% of ferrous sulfate | 50 | Aqueous solution containing 10% of larch tannin extract | 100 | Aqueous solution containing 2% of acetic acid | 20 | 90 | 2 | 80 | 7.5 |
| Comparative Example 1 | Domestic sewage sludge | 9930 parts | Aqueous solution containing 1.25% of ferrous sulfate | 50 | — | — | Aqueous solution containing 2% of acetic acid | 20 | 90 | 2 | 40 | 7.5 |

TABLE 1-continued

Process parameters of Example 1 to Example 10 in the present invention

| Item | To-be-deodorized sludge Type | Parts | Metal salt treatment solution Type | Parts | Tannin extract treatment solution Type | Parts | PH adjuster Type | Parts | Stirring of deodorization reaction system Speed (r/min) | Time (h) | Temperature (°C.) | PH value for deodorization reaction |
|---|---|---|---|---|---|---|---|---|---|---|---|---|
| Comparative Example 2 | Domestic sewage sludge | 9880 parts | — | — | Aqueous solution containing 10% of larch tannin extract | 100 | Aqueous solution containing 2% of acetic acid | 20 | 90 | 2 | 40 | 7.5 |

Detection and analysis of deodorization data were carried out on the deodorized sludge obtained by using the methods in Example 1 to Example 10, and Comparative Example 1 and Comparative Example 2. Gas indicators of an ammonia gas (including ammonia gas indicators in a standing state and a combustion state) and hydrogen sulfide obtained by using a gas detector are listed in Table 2 and Table 3.

TABLE 2

Ammonia gas indicators before and after sludge deodorization in examples of the present invention

| Group | Standing ammonia gas indicator (mg/m$^3$) Before deodorization | After deodorization | Removal rate | Combustion ammonia gas indicator (mg/m$^3$) Before deodorization | After deodorization | Removal rate |
|---|---|---|---|---|---|---|
| Example 1 | 20.7 | 8.2 | 60.39% | 48.2 | 20.2 | 58.09% |
| Example 2 | 20.7 | 7.3 | 64.73% | 48.2 | 23.6 | 51.04% |
| Example 3 | 20.7 | 4.1 | 80.19% | 48.2 | 16.5 | 65.77% |
| Example 4 | 20.7 | 3.8 | 81.64% | 48.2 | 11.1 | 76.97% |
| Example 5 | 20.7 | 3.9 | 81.16% | 48.2 | 17.5 | 63.69% |
| Example 6 | 20.7 | 4.3 | 79.23% | 48.2 | 15.3 | 68.26% |
| Example 7 | 20.7 | 3.3 | 84.06% | 48.2 | 10.6 | 78.01% |
| Example 8 | 20.7 | 5.0 | 75.85% | 48.2 | 12.4 | 74.27% |
| Example 9 | 20.7 | 4.7 | 77.29% | 48.2 | 17.1 | 64.52% |
| Example 10 | 20.7 | 4.0 | 80.68% | 48.2 | 10.8 | 77.59% |
| Comparative Example 1 | 20.7 | 18.8 | 9.18% | 48.2 | 35.6 | 26.14% |
| Comparative Example 2 | 20.7 | 12.4 | 40.10% | 48.2 | 28.1 | 41.70% |

TABLE 3

Hydrogen sulfide indicators before and after sludge deodorization in examples of the present invention

| Group | Standing hydrogen sulfide indicator (mg/m$^3$) Before deodorization | After deodorization | Removal rate | Combustion hydrogen sulfide indicator (mg/m$^3$) Before deodorization | After deodorization | Removal rate |
|---|---|---|---|---|---|---|
| Example 1 | 0.6 | 0.2 | 66.66% | 4.6 | 2.1 | 54.35% |
| Example 2 | 0.6 | 0.2 | 66.66% | 4.6 | 2.4 | 47.83% |
| Example 3 | 0.6 | <0.1 | >83.33% | 4.6 | 1.5 | 67.39% |
| Example 4 | 0.6 | <0.1 | >83.33% | 4.6 | 1.1 | 76.09% |
| Example 5 | 0.6 | <0.1 | >83.33% | 4.6 | 1.2 | 73.91% |
| Example 6 | 0.6 | <0.1 | >83.33% | 4.6 | 1.8 | 60.87% |
| Example 7 | 0.6 | <0.1 | >83.33% | 4.6 | 1.1 | 76.09% |
| Example 8 | 0.6 | <0.1 | >83.33% | 4.6 | 1.8 | 60.87% |
| Example 9 | 0.6 | <0.1 | >83.33% | 4.6 | 1.4 | 69.57% |
| Example 10 | 0.6 | <0.1 | >83.33% | 4.6 | 1.8 | 60.87% |
| Comparative Example 1 | 0.6 | 0.6 | 0.00% | 4.6 | 3.9 | 15.22% |
| Comparative Example 2 | 0.6 | 0.5 | 16.67% | 4.6 | 2.9 | 36.96% |

Through analysis on the examples and comparative examples, it can be learned that the ammonia gas and hydrogen sulfide can be significantly removed from the sludge by using the method with a metal salt and a tannin extract together, implementing efficient deodorization of the sludge, and deodorization efficiency is much higher than that of the method using a metal salt alone (in Comparative Example 1) or the method using a tannin extract alone (in Comparative Example 2). The treatment in Example 7 has the best effect on sludge deodorization. In the standing state, 84.06% of ammonia gas and greater than 83.33% of hydrogen sulfide can be removed. In the combustion state, 78.01% of ammonia gas and 76.09% of hydrogen sulfide can be removed. It can be found through comprehensive comparative analysis that an effect of sludge deodorization with the larch tannin extract in the present invention is better than that of sludge deodorization with other tannin extracts, and an effect of sludge deodorization with ferrous sulfate is better than that of sludge deodorization with other metal salts.

It is to be noted that the foregoing embodiments have been described in this specification, but cannot therefore limit the protection scope of the present invention. Therefore, changes and modifications of the embodiments in this specification based on the innovative concept of the present invention, or equivalent structure or process transformation made based on the description of the present invention, or direct or indirect application of the foregoing technical solutions to other related technical fields are all included in the protection scope of the present invention.

What is claimed is:

1. A method for deodorizing sludge with a metal salt and a tannin extract together, comprising the following steps:
    in parts by weight, uniformly mixing 9320-9910 parts of to-be-deodorized sludge and 20-100 parts of a metal salt treatment solution, and adding a mixture of 50-500 parts of a tannin extract treatment solution and 20-80 parts of a pH adjuster, to obtain a sludge deodorization reaction system, wherein the metal salt treatment solution is an aqueous solution containing 0.5%-2.5% of one or more of ferrous sulfate, ferric sulfate, ferric nitrate, and ferrous ammonium sulfate, the tannin extract treatment solution is an aqueous solution containing 5%-50% of one or more of a Myrica rubra tannin extract, a larch tannin extract, a valonea tannin extract, a quebracho tannin extract, and a wattle tannin extract, and
    controlling a pH value of the sludge deodorization reaction system to be 6.2-7.5, and stirring the sludge deodorization reaction system at a speed of 15-120 r/min for 1-3 h, prior to standing for 12-48 h.

2. The method according to claim 1, wherein in percentage by mass, the pH adjuster is an aqueous solution containing 2%-8% of one or more of acetic acid, sulfamic acid, sulfuric acid, formic acid, and oxalic acid.

3. The method according to claim 1, wherein a reaction temperature for the sludge deodorization reaction system is controlled to be 25° C.-80° C.

4. The method according to claim 1, wherein the 9320-9910 parts of the to-be-deodorized sludge and the 20-100 parts of the metal salt treatment solution are uniformly mixed by stirring at a speed of 15-120 r/min for 1-3 h.

5. The method according to claim 1, wherein the to-be-deodorized sludge comprises domestic sewage sludge, industrial wastewater sludge, drain-pipe sludge, and/or water-sediment sludge.

6. The method according to claim 1, wherein the to-be-deodorized sludge comprises one or more of untreated primarily precipitated sludge, secondarily precipitated residual sludge, raw sludge obtained by mixing the untreated primarily precipitated sludge and the secondarily precipitated residual sludge, aerobically or anaerobically digested sludge, and dehydrated and dried sludge.

7. Deodorized sludge, wherein the deodorized sludge is obtained through treatment by using the method according to claim 1.

8. Use A method of using the deodorized sludge according to claim 7 in a resource utilization process selected from the group consisting of incineration, pyrolysis, and carbonization.

9. The deodorized sludge according to claim 7, wherein in the method, in percentage by mass, the pH adjuster is an aqueous solution containing 2%-8% of one or more of acetic acid, sulfamic acid, sulfuric acid, formic acid, and oxalic acid.

10. The deodorized sludge according to claim 7, wherein in the method, a reaction temperature for the sludge deodorization reaction system is controlled to be 25° C.-80° C.

11. The deodorized sludge according to claim 7, wherein in the method, the 9320-9910 parts of the to-be-deodorized sludge and the 20-100 parts of the metal salt treatment solution are uniformly mixed by stirring at a speed of 15-120 r/min for 1-3 h.

12. The deodorized sludge according to claim 7, wherein in the method, the to-be-deodorized sludge comprises domestic sewage sludge, industrial wastewater sludge, drain-pipe sludge, and/or water-sediment sludge.

13. The deodorized sludge according to claim 7, wherein in the method, the to-be-deodorized sludge comprises one or more of untreated primarily precipitated sludge, secondarily precipitated residual sludge, raw sludge obtained by mixing the untreated primarily precipitated sludge and the secondarily precipitated residual sludge, aerobically or anaerobically digested sludge, and dehydrated and dried sludge.

* * * * *